United States Patent [19]

Nakasaki

[11] 4,360,050
[45] Nov. 23, 1982

[54] LOW PRESSURE LOW SPEED TIRE

[75] Inventor: Eiji Nakasaki, Kakogawa, Japan

[73] Assignee: Sumitomo Rubber Industries, Ltd., Kobe, Japan

[21] Appl. No.: 147,345

[22] Filed: May 7, 1980

[30] Foreign Application Priority Data

May 6, 1979 [JP] Japan .................................. 54-60738

[51] Int. Cl.³ .......................... B60C 9/00; B60C 15/00
[52] U.S. Cl. ................................ 152/354 R; 152/358; 152/359
[58] Field of Search .................. 152/359, 358, 357 R, 152/356 R, 354 R

[56] References Cited

U.S. PATENT DOCUMENTS

| | | | |
|---|---|---|---|
| 2,273,200 | 2/1942 | Hoff | 152/359 |
| 3,614,864 | 10/1971 | Daimler et al. | 152/359 X |
| 3,929,180 | 12/1975 | Kawase et al. | 152/359 |
| 4,267,873 | 5/1981 | McColl | 152/354 R X |

*Primary Examiner*—Edward C. Kimlin
*Assistant Examiner*—Thomas Bokan
*Attorney, Agent, or Firm*—Eugene E. Geoffrey, Jr.

[57] ABSTRACT

A low pressure tire, which is effectively used with a relatively small load in all terrain vehicles suited to be driven on various uneven grounds such as bad roads, tillage and sandy soil, comprising crown and side portions which consist of a carcass ply formed of synthetic fibre monofilaments formed in a reed-screen pattern and a rubber layer.

2 Claims, 4 Drawing Figures

LOW PRESSURE LOW SPEED TIRE

This invention relates to a tire for all terrain vehicles, so-called "ATV tire", which is suitable for use on various uneven ground, such as bad roads, tillage and sandy soil, and, especially, to a low pressure tire for leisure cars, agricultural machines and the like, which are used under relatively low weight conditions.

In the prior art automobile tires, as described, for example, in Japanese Pat. No. 826,414, have reinforcing materials embedded therein, such as bead wires, carcass plies and breaker plies, as their internal textures, and the processes for manufacturing same are substantially complicated. However, it is undesirable to apply a complicated texture such as that of the regular automobile tire to a leisure car tire which is generally used at relatively low speed under relatively low weight conditions, in view of driving conditions and economy. It is, of course, necessary that various characteristics of the tire, such as comfort, operational stability and rolling resistance, are satisfactory also at low speeds under low weight conditions. However, the above mentioned texture of automobile tires is not only insufficient sometimes in these characteristics, but also is relatively expensive. A so-called "cordless tire" has been developed as a low pressure tire for the specific use as described above. This tire does not include reinforcing material such as a carcass ply and breaker ply and, therefore, it is very advantageous to manufacture. On the contrary, however, the cordless tire is generally insufficient in such characteristics as mechanical strength and operational stability.

Accordingly, an object of this invention is to overcome the above disadvantages of the cordless tire while conserving its preferable features, that is, to provide a low pressure tire which is satisfactory in the characteristics required to the so-called "ATV tire" used at low pressure and low speed.

In accordance with this invention, a low pressure tire is provided comprising crown and side portions which consist of a carcass ply and a rubber layer. The carcass ply is composed of synthetic fibre monofilaments formed into a reed-screen pattern.

These and other features of this invention will be described in more detail hereinunder with reference to the accompanying drawings.

IN THE DRAWINGS

Figure 1:
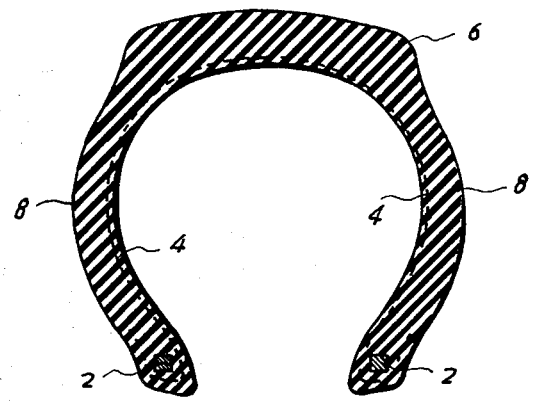
FIG. 1 is a schematic cross-sectional view of an embodiment of low pressure tire according to this invention.

Referring to FIG. 1 showing the radial cross-section of a low pressure tire according to this invention, the tire includes a pair of bead wires 2, a carcass ply 4, a crown portion 6 and a pair of side portions 8 and has the structure of a "cordless tire" provided with a carcass ply. The carcass ply 4 is a single layer of nylon monofilaments of 840 deniers formed into a reed-screen pattern, in which the monofilaments are arranged vertically to the equator plane of the tire. The tire size is 22×11.00−8.

This low pressure tire includes only the bead wires 2 and carcass ply 4 as reinforcing materials other than rubber material and, therefore, it is very simple in structure and very easy to manufacture as compared with the prior art cross-ply tire and the like.

Figure 2:
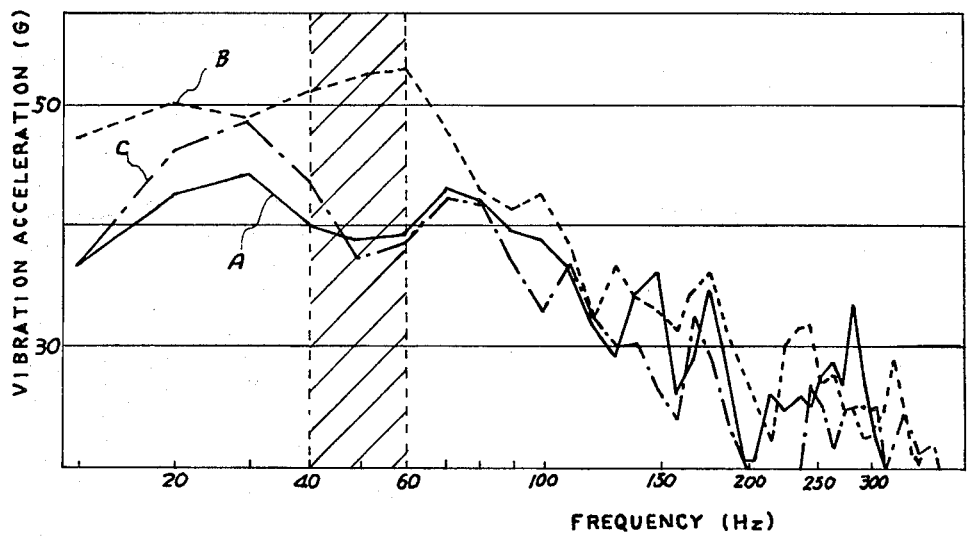
FIG. 2 is a graph representing a result of measurement of vertical vibration acceleration of axle of the inventive tire in comparison with a prior art tire.

In order to examine comfort afforded by this tire, vertical vibration acceleration of the axle was measured with a leisure-type car, HONDA ATC 110, manufactured and sold by Honda Gikenkogyo K. K., Tokyo, with air pressure at 0.15 kilograms per square centimeter, weight load of 70 kilograms per tire and a speed of 40 kilometers per hour. The result of measurement is shown in term of G (acceleration of gravity) with respect to vibration frequency in Hertz by solid line A in FIG. 2. For the purpose of comparison, the prior art cross-ply tire and cordless tire were also tested under the same conditions and the results of measurements are shown by dashed line B and chain line C, respectively, in the same drawing. The tested cross-ply tire included two cross-plied carcass layers of nylon cords formed of 840 denier filaments. As clearly seen from the drawing, the inventive tire exhibited very low acceleration of vibration, which is quite similar to that of cordless tire, within a frequency range of 40 to 60 Hertz as shadowed, in which the human body is most sensitive to vibration. This means that the superior comfort of the cordless tire has been conserved by the inventive tire.

Figure 3:
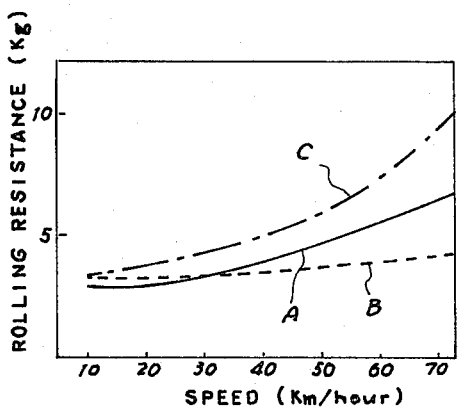
FIG. 3 is a graph representing a result of measurement of rolling resistance of the inventive tire in comparison with a prior art tire.

FIG. 3 shows the results of measurement of rolling resistance in kilograms with respect to driving speed in kilometers per hour. The measurement was made on the same three samples of tires, A, B and C as in FIG. 2, with air pressure at 0.15 kilograms per square centimeter and weight load of 62 kilograms per tire, using a 60 inch drum. It can be seen clearly that, in rolling resistance, the inventive tire is better than the others within the low speed region, especially, at 30 kilometers per hour.

Figure 4:
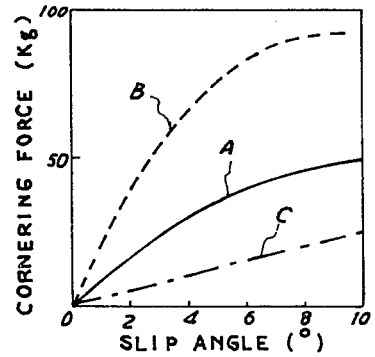
FIG. 4 is a graph representing a result of measurement of cornering force of the inventive tire in comparison with a prior art tire.

Cornering force was measured then on the same samples of tires with air pressures at 0.15 kilograms per square centimeter, weight load of 62 kilograms per tire and a speed at 10 kilometers per hour, using a knurled road surface. In FIG. 4, the measured cornering force is plotted in kilograms with respect to slip angle in degrees, for each of the tires and curves A, B and C correspond to those in FIGS. 2 and 3. It can be seen from this drawing that the cornering force of the inventive tire is intermediate the cordless and cross-ply tires but is sufficiently higher than that of the cordless tire.

In addition, the same tires were subjected to high speed durability tests, with air pressure at 0.1 kilograms per square centimeter and a weight load of 62 kilograms per tire. After preliminary driving followed by pressure adjustment, driving was continued starting from a speed of 60 kilometers per hour and increasing the speed by 10 kilometers per hour after every 30 minutes of driving until the speed reached 100 kilometers per hour. After the completion of driving, cracks were observed over the whole peripheries of the first and second blocks of the cordless tire, though no damage was found in the inventive tire and cross-ply tire. Standing wave generating speeds of the inventive tire and cordless tire were 70 and 60 kilometers per hour, respectively, while no standing wave was produced by the cross-ply tire. The result of this test shows that the inventive tire is superior in high speed durability as compared with the cordless tire.

Although, in the above embodiment of this invention, nylon monofilaments of 840 deniers were used to form the carcass ply 4, repeated experiments showed that the monofilament might be of 500 to 1000 deniers and, preferably, 750 to 900 deniers. It has also been found that the monofilament is preferably twisted about 10 to 40 times per five centimeters in order to improve bending endurance. The angle of the monofilaments with respect to the equator plane of tire need not always be 90 degrees, and similar result could be obtained with this angle between 75 and 90 degrees. Although a single carcass ply was used in the above embodiment of this invention, it has also been found that substantially similar result can be obtained with two or more carcass plies of monofilaments.

As described above, a novel low pressure tire, which has been highly improved in characteristics from the cordless tire and substantially simplified in structure from the cross-ply tire, has been thus provided.

What is claimed is:

1. A low pressure, low speed tire for leisure vehicles utilizing operating pressures not exceeding three pounds per square inch and having improved mechanical strength and operational stability consisting essentially of a crown portion and side wall portions, said portions having a carcass-ply containing at least two sets of synthetic fibre monofilaments with one set disposed at approximately 90° relative to the other set and forming a pattern, one set of monofilaments being disposed at angles of 75 to 90 degrees with respect to the equator plane of the tire and a rubber layer overlying said carcass-ply.

2. A low pressure, low speed tire for leisure vehicles according to claim 1 wherein said monofilaments are in the range of 500 to 1000 deniers with each filament twisted 10 to 40 times per 5 centimeters of length thereof.

* * * * *